United States Patent
Zager et al.

(10) Patent No.: US 10,203,159 B2
(45) Date of Patent: Feb. 12, 2019

(54) HEAT EXCHANGER WITH INTEGRAL BLEED AIR EJECTOR

(71) Applicant: Hamilton Sundstrand Corporation, Windsor Locks, CT (US)

(72) Inventors: Michael Zager, Windsor, CT (US); Roberto J. Perez, Windsor, CT (US); Michael Doe, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 15/332,538

(22) Filed: Oct. 24, 2016

(65) Prior Publication Data

US 2018/0112921 A1 Apr. 26, 2018

(51) Int. Cl.
*F02C 7/12* (2006.01)
*F04F 5/14* (2006.01)
(Continued)

(52) U.S. Cl.
CPC ............ *F28C 3/02* (2013.01); *B60K 11/04* (2013.01); *F02C 7/12* (2013.01); *F04F 5/14* (2013.01);
(Continued)

(58) Field of Classification Search
CPC . F28C 3/02; F28D 9/0093; F28F 13/06; F28F 27/02; F28F 1/022; B60K 11/04; F02C 7/12; F04F 5/14; F04F 5/462
See application file for complete search history.

(56) References Cited

U.S. PATENT DOCUMENTS 7,445,659 B2 * 11/2008 Schwalm ............... B01D 53/22
                                                  95/22
2009/0288811 A1 * 11/2009 Bolla ..................... F28D 9/0062
                                                  165/166
(Continued)

FOREIGN PATENT DOCUMENTS

EP         0255313 A2     3/1988
JP       2014118103 A     6/2014
(Continued)

OTHER PUBLICATIONS https://www.merriam-webster.com/dictionary/gusset Dec. 10, 2017.*
Extended European Search Report for EP Application No. 17197962.8, dated Mar. 27, 2018, 7 pages.

*Primary Examiner* — Jon T. Schermerhorn, Jr.
(74) *Attorney, Agent, or Firm* — Kinney & Lange, P.A.

(57) ABSTRACT

A heat exchanger assembly includes a plurality of first and second fluid passages defined by a pair of opposing first fluid passage walls and a plurality of first fluid diverters disposed between the first fluid passages walls. The second fluid passages are defined by a pair of opposing second fluid passage walls and a plurality of second fluid diverters disposed between the second fluid passage walls. An ejector is integrated into the heat exchanger assembly. The ejector includes: an integral ejector passage, wherein the integral ejector passage is a first fluid passage; a primary inlet configured to receive a hot fluid; an outlet nozzle configured to eject the hot fluid; a secondary inlet configured to receive a cold fluid, wherein the secondary inlet is in fluid communication with a second fluid passage; and a mixing section in fluid communication with the outlet nozzle and the secondary inlet.

14 Claims, 3 Drawing Sheets

(51) Int. Cl.
  *F04F 5/46*  (2006.01)
  *F28C 3/02*  (2006.01)
  *F28D 9/00*  (2006.01)
  *F28F 1/02*  (2006.01)
  *B60K 11/04*  (2006.01)
  *F28F 13/06*  (2006.01)
  *F28F 27/02*  (2006.01)
  *F28D 21/00*  (2006.01)

(52) U.S. Cl.
  CPC ............ *F04F 5/462* (2013.01); *F28D 9/0093* (2013.01); *F28F 1/022* (2013.01); *F28F 13/06* (2013.01); *F28F 27/02* (2013.01); *F28D 2021/0021* (2013.01); *F28F 2250/08* (2013.01)

(56) References Cited

U.S. PATENT DOCUMENTS

2013/0265848 A1\* 10/2013 Wurz .................... F04D 29/541
                         366/337
2014/0144139 A1\* 5/2014 Alecu ....................... F02C 7/14
                          60/728

FOREIGN PATENT DOCUMENTS

| | | |
|---|---|---|
| JP | 2015001155 A | 1/2015 |
| JP | 2015124748 A | 7/2015 |

\* cited by examiner

HEAT EXCHANGER WITH INTEGRAL BLEED AIR EJECTOR

BACKGROUND

During operation of a gas turbine powered aircraft, cold airflow can be introduced to a heat exchanger by a fan, or as ram air when the aircraft is in motion. However, when no fan is available, or when the aircraft is on the ground, engine bleed air can be used to induce a cooling air flow through the heat exchanger. In such cases, an ejector in flow communication with the heat exchanger serves to draw cold air into the heat exchanger.

One problem with using an ejector, which is located separate from the heat exchanger, is that it requires additional materials to connect it in flow communication with the heat exchanger. It can also be difficult to fit both the ejector and the heat exchanger into the available space on an aircraft. Accordingly, there is a need for a heat exchanger and an ejector that, together, have a small footprint.

SUMMARY

A heat exchanger assembly includes a plurality of first and second fluid passages. The first fluid passages are defined by a pair of opposing first fluid passage walls and a plurality of first fluid diverters disposed between the first fluid passages walls. The second fluid passages are defined by a pair of opposing second fluid passage walls and a plurality of second fluid diverters disposed between the second fluid passage walls. An ejector is integrated into the heat exchanger assembly. The ejector includes an integral ejector passage, wherein the integral ejector passage is a first fluid passage, and wherein the integral ejector passage includes: a primary inlet configured to receive a hot fluid; and an outlet nozzle configured to eject the hot fluid. The ejector also includes a secondary inlet configured to receive a cold fluid, wherein the secondary inlet is in fluid communication with a second fluid passage; and a mixing section in fluid communication with the outlet nozzle of the integral ejector passage and the secondary inlet.

A method of making a heat exchanger includes: forming a plurality of opposing first fluid passage walls and a plurality of first fluid diverters disposed between the first fluid passages walls, where the plurality of first fluid passage walls and the plurality of first fluid diverters define a plurality of first fluid passages; forming a plurality of opposing second fluid passage walls and a plurality of second fluid diverters disposed between the second fluid passage walls, where the plurality of second fluid passage walls and the plurality of second fluid diverters define a plurality of second fluid passages; and integrating an ejector into the heat exchanger assembly. The ejector includes an integral ejector passage, wherein the integral ejector passage is a first fluid passage, and wherein the integral ejector passage includes: a primary inlet configured to receive a hot fluid; and an outlet nozzle configured to eject the hot fluid. The ejector also includes a secondary inlet configured to receive a cold fluid, wherein the secondary inlet is in fluid communication with a second fluid passage; and a mixing section in fluid communication with the outlet nozzle of the integral ejector passage and the secondary inlet.

DETAILED DESCRIPTION

The disclosed heat exchanger assembly includes an integral bleed air ejector. Additive manufacturing is used to build the ejector into a hot fluid passage at the cold outlet end of the heat exchanger. The ejector is configured to draw air from adjacent cold air passages when in operation. The integral ejector requires less space and material than traditional ejectors that are separate from the heat exchanger.

Figure 1:
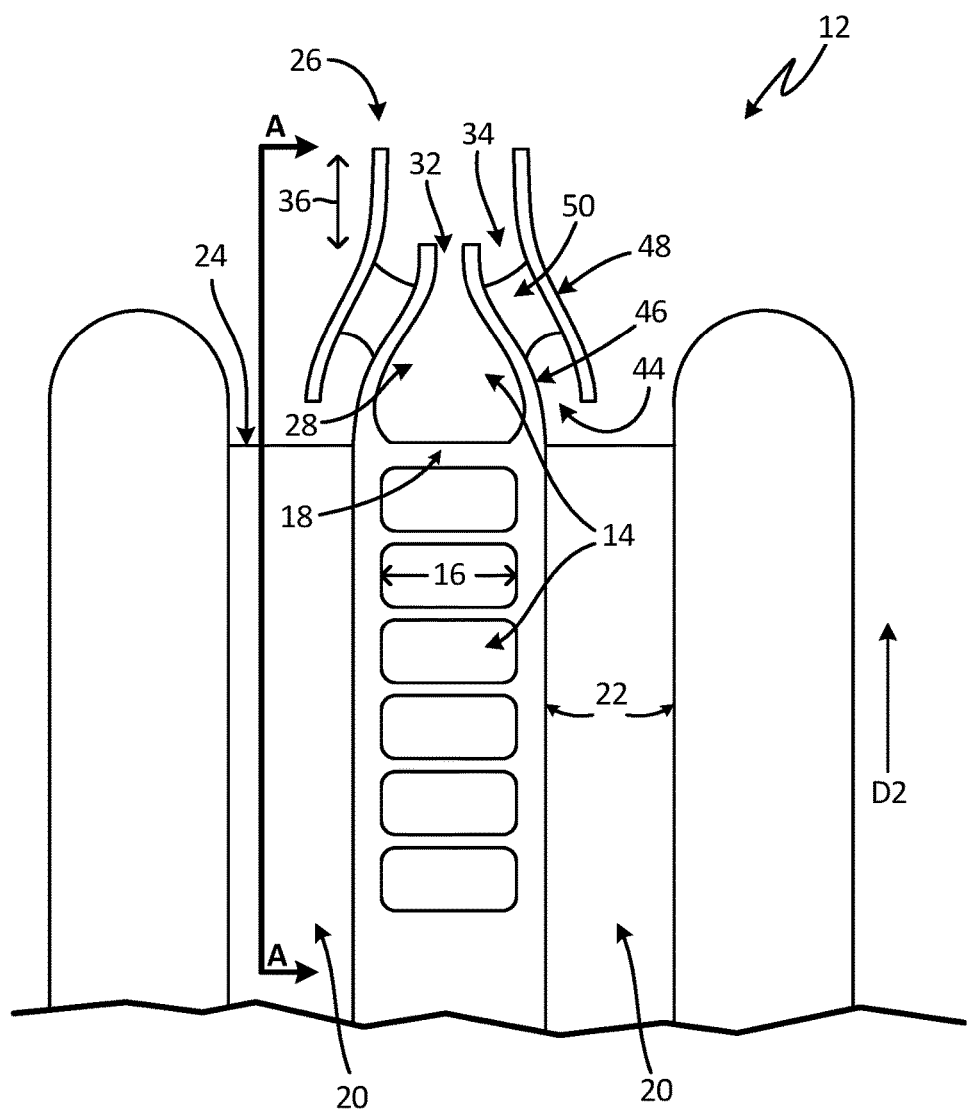
FIG. 1 is a cross-sectional view of a heat exchanger assembly.

FIG. 1 is a cross-sectional view of heat exchanger assembly 10 (shown in FIG. 2) in the vicinity of cold outlet face 12. Heat exchanger assembly 10 includes first fluid passages 14, defined by opposing first fluid passage walls 16, and first fluid diverters 18. First fluid diverters 18 are disposed between first fluid passage walls 16. Heat exchanger assembly 10 further includes second fluid passages 20, defined by opposing second fluid passage walls 22, and second fluid diverters 24. Second fluid diverters 24 are disposed between second fluid passage walls 22. In the embodiment shown, second fluid diverters 24 are configured as fins, but in other embodiments, can be configured as pins, or a combination of fins and pins.

Figure 3:
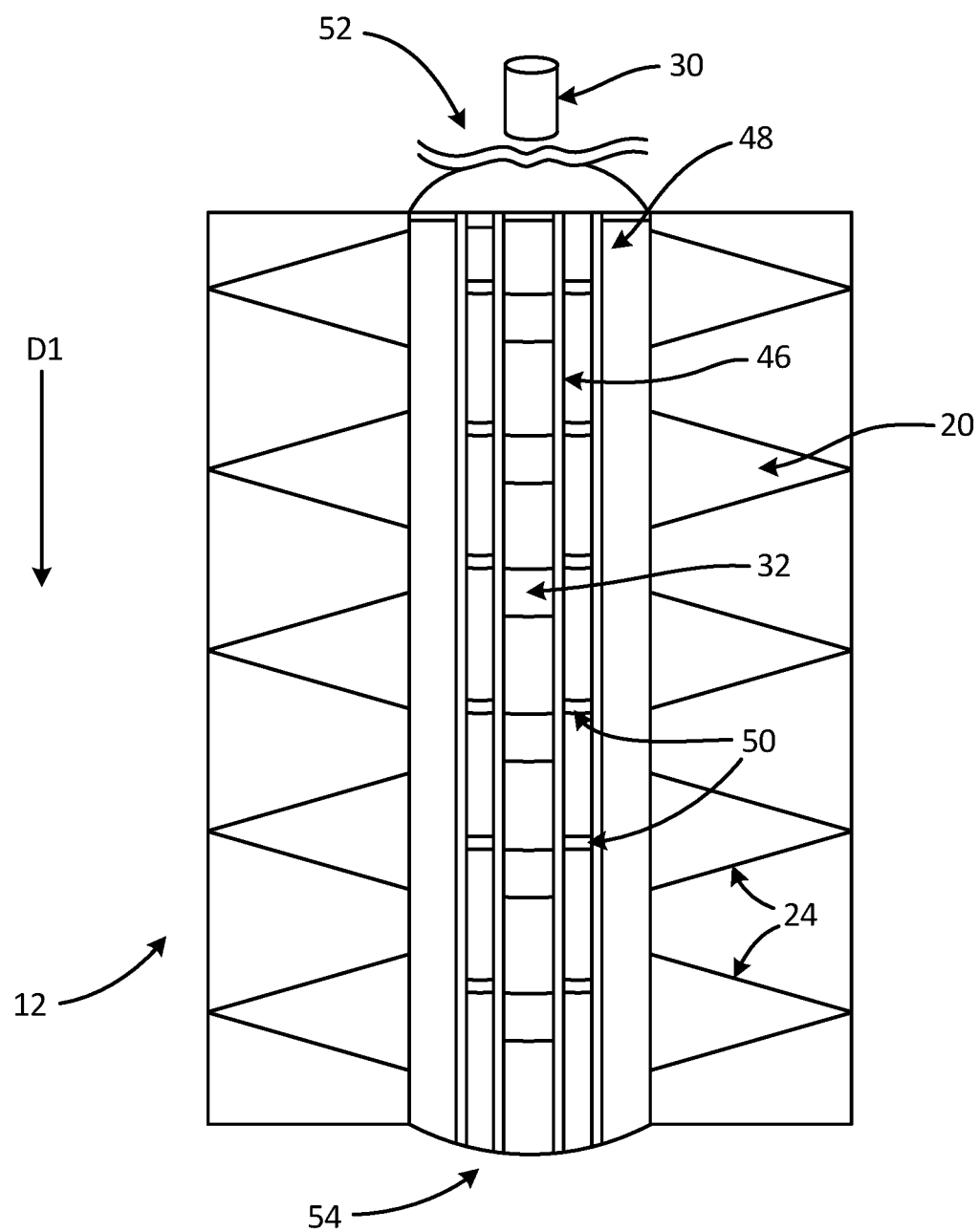
FIG. 3 is a front view of a cold outlet face of the heat exchanger assembly of FIG. 1.

First fluid passages 14 extend in direction D1 (shown in FIG. 3). Second fluid passages 20 extend in a direction D2. Direction D2 is generally perpendicular to direction D1.

Ejector 26 is integrated into heat exchanger assembly 10. Ejector 26 includes integral ejector passage 28, which is a first fluid passage 14. Integral ejector passage 28 includes primary inlet 30 (shown in FIG. 3) and outlet nozzle 32. Ejector 26 further includes secondary inlet 34 and mixing section 36. Secondary inlet 34 is in fluid communication with a second fluid passage 20. Mixing section 36 is in fluid communication with outlet nozzle 32 and secondary inlet 34. In one embodiment, outlet nozzle 32 is an opening, such as a slot.

Figure 2:
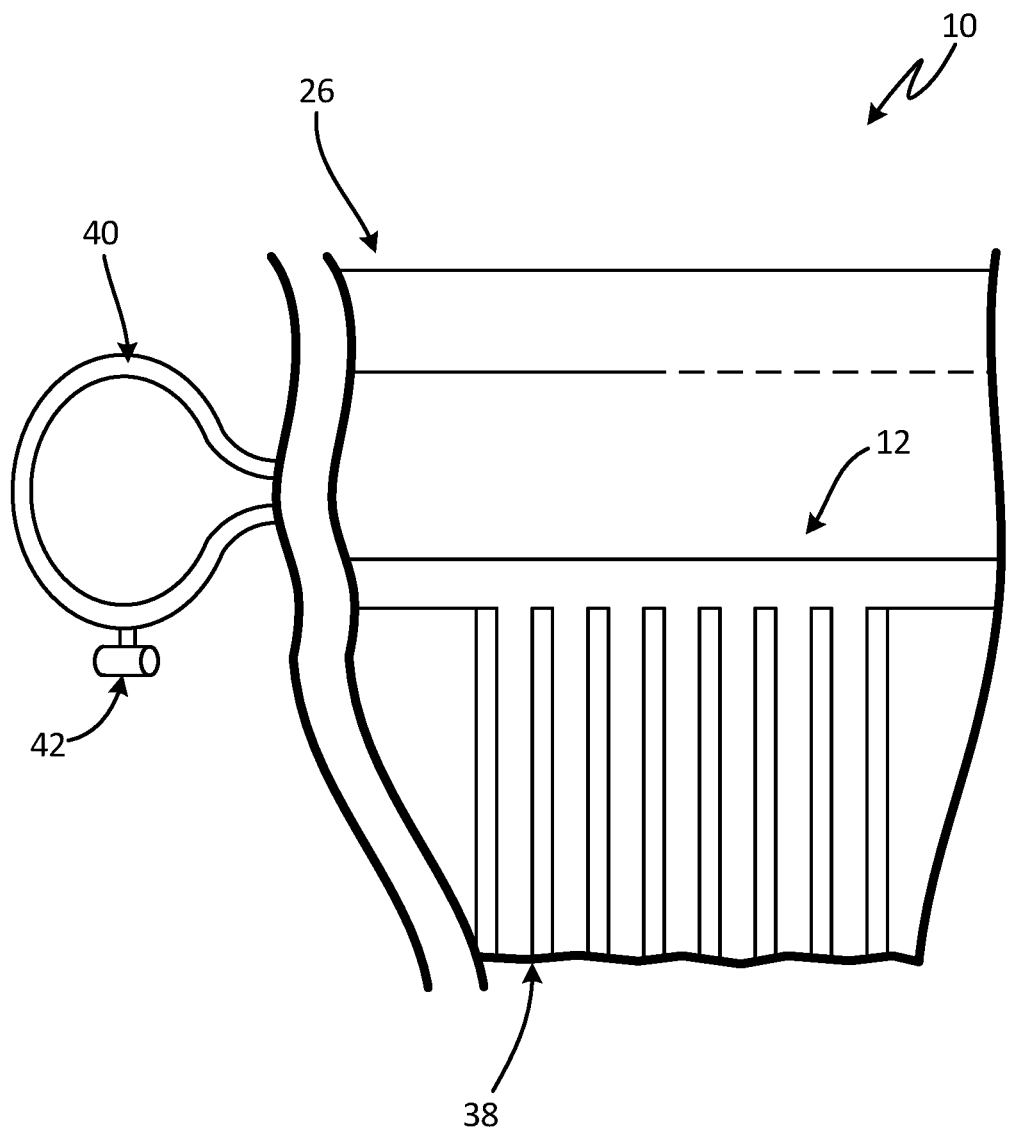
FIG. 2 is a sectional view of the heat exchanger assembly of FIG. 1.

FIG. 2 is a sectional view of heat exchanger assembly 10 taken along line A-A. Heat exchanger assembly 10 includes ejector 26, cold outlet face 12, heat exchanger 38, and manifold 40. Manifold 40 is configured to selectively introduce engine bleed air into ejector 26. Air flow into manifold 40 is controlled by ejector shutoff valve 42. In one embodiment, ejector shutoff valve 42 is coupled to manifold 40. In other embodiments, ejector shutoff valve 42 can be attached directly to heat exchanger 38.

In operation of the disclosed heat exchanger assembly, manifold 40 introduces bleed air—a compressed, hot fluid— into integral ejector passage 28 through primary inlet 30. Thereafter, the hot fluid is ejected into mixing section 36 of ejector 26 through outlet nozzle 32. When the hot fluid is ejected, it creates an area of low pressure that draws fluid into the adjacent secondary inlet 34. Because secondary inlet 34 is in communication with second fluid passages 20, cold air is drawn into second fluid passages 20 at a cold inlet face (not shown) of heat exchanger 38. That is, the hot fluid serves as the motive fluid, and the cold fluid serves as the suction fluid for ejector 26. The cold fluid flows through second fluid passages 20 and exits at cold outlet face 12. However, a portion of the cold fluid flow enters mixing section 36 through secondary inlet 34. The hot and cold fluids mix in mixing section 36 to form an intermediate fluid.

The intermediate fluid is expelled through a cold air outlet (not shown) of heat exchanger assembly 10, and can be routed overboard.

Secondary inlet 34 communicates with a second fluid passage 20 via inlet passage 44. Inlet passage 44 is defined by inner wall 46 and outer wall 48. In the embodiment shown in FIG. 1, inner wall 46 converges near outlet nozzle 32. Outer wall 48 converges in a complementary manner to maintain generally even spacing from inner wall 46. Inner wall 46 and outer wall 48 are joined by connector 50. In one embodiment, the connector is a gusset. In other embodiments, the connector can be another suitable connecting structure.

As shown in FIG. 3, integral ejector passage 28 extends from first fluid inlet end 52 to first fluid outlet end 54 of a first fluid passage 14. In the disclosed embodiment, integral ejector passage 28 is a downstream first fluid passage 14.

In some embodiments, heat exchanger assembly 10 includes a plurality of ejectors 26 along cold outlet face 12 based on system requirements. Additionally, first and second fluid passage walls 16, 22 and diverters 18, 24, as well as the ejector 26, can be formed from aluminum. In other embodiments, other suitable materials can be used, including steel, nickel alloys, or titanium, or combinations of such materials.

Heat exchanger assembly 10 can be manufactured by an additive manufacturing process such as, direct metal laser sintering (DMLS), laser net shape manufacturing (LNSM), electron beam manufacturing (EBM), or laminated object manufacturing (LOM), to name a few non-limiting examples. Additive manufacturing techniques can include, for example, forming a three-dimensional object through layer-by-layer construction of a plurality of thin sheets or material, or through powder bed infusion.

Heat exchanger assembly 10 can be additively manufactured by forming a plurality of first and second fluid passage walls and diverters, which define a plurality of first and second fluid passages. An ejector is integrated into the heat exchanger assembly. The ejector includes an integral ejector passage, where the integral ejector passage is a first fluid passage, and where the integral ejector passage includes: a primary inlet configured to receive a hot fluid and an outlet nozzle configured to eject the hot fluid. The ejector further includes a secondary inlet configured to receive a cold fluid, where the secondary inlet is in fluid communication with a second fluid passage and a mixing section in fluid communication with the outlet nozzle of the integral ejector passage and the secondary inlet.

The disclosed heat exchanger assembly provides a means of inducing cold air flow through the heat exchanger when other means, such as a fan or ram air, are unavailable. Forming the heat exchanger assembly using additive manufacturing eliminates the need for a separate ejector and additional coupling materials. It also allows the heat exchanger assembly to take up less space on the aircraft.

Discussion of Possible Embodiments

The following are non-exclusive descriptions of possible embodiments of the present invention.

A heat exchanger assembly includes a plurality of first and second fluid passages. The first fluid passages are defined by a pair of opposing first fluid passage walls and a plurality of first fluid diverters disposed between the first fluid passages walls. The second fluid passages are defined by a pair of opposing second fluid passage walls and a plurality of second fluid diverters disposed between the second fluid passage walls. An ejector is integrated into the heat exchanger assembly. The ejector includes an integral ejector passage, wherein the integral ejector passage is a first fluid passage, and wherein the integral ejector passage includes: a primary inlet configured to receive a hot fluid; and an outlet nozzle configured to eject the hot fluid. The ejector also includes a secondary inlet configured to receive a cold fluid, wherein the secondary inlet is in fluid communication with a second fluid passage; and a mixing section in fluid communication with the outlet nozzle of the integral ejector passage and the secondary inlet.

The assembly of the preceding paragraph can optionally include, additionally and/or alternatively, any one or more of the following features, configurations and/or additional components:

A manifold configured to introduce the hot fluid into the primary inlet.

A valve for selectively controlling the introduction of the hot fluid into the manifold.

A further embodiment of any of the foregoing heat exchanger assemblies, wherein the integral ejector passage comprises a first fluid inlet end and a first fluid outlet end, and wherein the ejector extends from the first fluid inlet end to the first fluid outlet end.

A further embodiment of any of the foregoing heat exchanger assemblies, wherein the integral ejector passage is a downstream first fluid passage.

A further embodiment of any of the foregoing heat exchanger assemblies, wherein an inlet passage joins the secondary inlet to the second fluid passage.

A further embodiment of any of the foregoing heat exchanger assemblies, wherein the inlet passage comprises an inner wall and an outer wall, and wherein the inner wall and outer wall are connected by a gusset.

A further embodiment of any of the foregoing heat exchanger assemblies, wherein the plurality of first and second fluid passage walls and diverters are formed from aluminum.

A further embodiment of any of the foregoing heat exchanger assemblies, wherein the plurality of first and second fluid passage walls and diverters are formed from a material selected from the group consisting of steel, nickel alloys, titanium, and combinations thereof.

A method of making a heat exchanger includes: forming a plurality of opposing first fluid passage walls and a plurality of first fluid diverters disposed between the first fluid passages walls, wherein the plurality of first fluid passage walls and the plurality of first fluid diverters define a plurality of first fluid passages; forming a plurality of opposing second fluid passage walls and a plurality of second fluid diverters disposed between the second fluid passage walls, wherein the plurality of second fluid passage walls and the plurality of second fluid diverters define a plurality of second fluid passages; and integrating an ejector into the heat exchanger assembly. The ejector includes an integral ejector passage, wherein the integral ejector passage is a first fluid passage, and wherein the integral ejector passage includes: a primary inlet configured to receive a hot fluid; and an outlet nozzle configured to eject the hot fluid. The ejector also includes a secondary inlet configured to receive a cold fluid, wherein the secondary inlet is in fluid communication with a second fluid passage; and a mixing section in fluid communication with the outlet nozzle of the integral ejector passage and the secondary inlet.

The method of the preceding paragraph can optionally include, additionally and/or alternatively, any one or more of the following features, configurations and/or additional components:

The method includes extending the ejector from an inlet end to an outlet end of the integral ejector passage.

The method includes forming an inlet passage having an inner wall and an outer wall.

The method includes connecting the inner wall to the outer wall with a gusset.

The method includes forming the heat exchanger assembly by additive manufacturing.

The method includes forming the heat exchanger assembly from aluminum.

The method includes forming the heat exchanger assembly from a material selected from the group consisting of steel, nickel alloys, titanium, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger assembly comprising:
   a plurality of first fluid passages, the plurality of first fluid passages defined by:
      a pair of opposing first fluid passage walls; and
      a plurality of first fluid diverters disposed between the first fluid passage walls;
      wherein each of the plurality of first fluid passages extends in a first direction from a first fluid inlet end to a first fluid outlet end;
   a plurality of second fluid passages, the plurality of second fluid passages defined by:
      a pair of opposing second fluid passage walls; and
      a plurality of second fluid diverters disposed between the second fluid passage walls; and
   an ejector integrated into the heat exchanger assembly, the ejector comprising:
      an integral ejector passage, wherein the integral ejector passage is a first fluid passage extending in the first direction from the first fluid inlet end to the first fluid outlet end, and wherein the integral ejector passage comprises:
         a primary inlet located at the first fluid inlet end and configured to receive a hot fluid; and
         an outlet nozzle configured to eject the hot fluid;
      a secondary inlet configured to receive a cold fluid, wherein the secondary inlet is in fluid communication with a second fluid passage; and
      a mixing section in fluid communication with the outlet nozzle of the integral ejector passage and the secondary inlet.

2. The assembly of claim 1, further comprising: a manifold configured to introduce the hot fluid into the primary inlet.

3. The assembly of claim 1, further comprising: a valve for selectively controlling the introduction of the hot fluid into the manifold.

4. The assembly of claim 1, wherein the integral ejector passage is a downstream first fluid passage.

5. The assembly of claim 1, wherein an inlet passage joins the secondary inlet to the second fluid passage.

6. The assembly of claim 5, wherein the secondary inlet passage comprises an inner wall and an outer wall, and wherein the inner wall and outer wall are joined by a connector.

7. The assembly of claim 1, wherein the plurality of first and second fluid passage walls and diverters are formed from aluminum.

8. The assembly of claim 1, wherein the plurality of first and second fluid passage walls and diverters are formed from a material selected from the group consisting of steel, nickel alloys, titanium, and combinations thereof.

9. A method of making a heat exchanger assembly comprising:
   forming a plurality of opposing first fluid passage walls and a plurality of first fluid diverters disposed between the first fluid passage walls; wherein the plurality of first fluid passage walls and the plurality of first fluid diverters define a plurality of first fluid passages, each of the plurality of first fluid passages extending in a first direction from a first fluid inlet end to a first fluid outlet end;
   forming a pair of opposing second fluid passage walls and a plurality of second fluid diverters disposed between the second fluid passage walls; wherein the plurality of second fluid passage walls and the plurality of second fluid diverters define a plurality of second fluid passages;
   integrating an ejector into the heat exchanger assembly, the ejector comprising:
      an integral ejector passage extending in the first direction from the first fluid inlet end to the first fluid outlet end, wherein the integral ejector passage is a first fluid passage, and wherein the integral ejector passage comprises:
         a primary inlet located at the first fluid inlet end and configured to receive a hot fluid; and
         an outlet nozzle configured to eject the hot fluid;
      a secondary inlet configured to receive a cold fluid, wherein the secondary inlet is in fluid communication with a second fluid passage; and
      a mixing section in fluid communication with the outlet nozzle of the integral ejector passage and the secondary inlet.

10. The method of claim 9, further comprising: forming an inlet passage having an inner wall and an outer wall.

11. The method of claim 10, further comprising: connecting the inner wall to the outer wall with a connector.

12. The method of claim 9, further comprising: forming the heat exchanger assembly by additive manufacturing.

13. The method of claim 9, further comprising: forming the heat exchanger assembly from aluminum.

14. The method of claim 9, further comprising: forming the heat exchanger from a material selected from the group consisting of steel, nickel alloys, titanium, and combinations thereof.

* * * * *